(12) United States Patent
Augustine et al.

(10) Patent No.: US 6,574,630 B1
(45) Date of Patent: Jun. 3, 2003

(54) INVESTOR RELATIONS EVENT NOTIFICATION SYSTEM AND METHOD

(75) Inventors: Andrew W. Augustine, Brighton, MA (US); Robert M. Coran, Cambridge, MA (US); Robert I. Adler, Belmont, MA (US)

(73) Assignee: CCBN.com, Inc., Boston, MA (US)

(*) Notice: Subject to any disclaimer, the term of this patent is extended or adjusted under 35 U.S.C. 154(b) by 342 days.

(21) Appl. No.: 09/639,349

(22) Filed: Aug. 16, 2000

Related U.S. Application Data

(63) Continuation-in-part of application No. 09/493,075, filed on Jan. 28, 2000.

(51) Int. Cl.[7] .............................................. G06F 17/30
(52) U.S. Cl. ...................... 707/10; 707/104.1; 707/513
(58) Field of Search .......................... 707/1, 10, 104.1, 707/513; 705/8, 36, 35; 709/204, 217

(56) References Cited

U.S. PATENT DOCUMENTS

| | | | |
|---|---|---|---|
| 4,554,418 A | * 11/1985 | Toy | 379/88.01 |
| 5,802,518 A | * 9/1998 | Karaev et al. | 707/9 |
| 5,940,843 A | * 8/1999 | Zucknovich et al. | 707/516 |
| 6,310,889 B1 | * 10/2001 | Parsons et al. | 709/203 |
| 6,405,204 B1 | * 6/2002 | Baker et al. | 707/100 |

OTHER PUBLICATIONS

Brockhoff, K..K. Necessary conditions for successful company research, Jul. 1997, Portland International Conference on Management and Technology Innovation in Technical managementThe key to Global Leadership. PP. 508–511.*

Coulter, G. and Marquis, A., "Mastering Microsoft® 98," pp. 252–312, 459–484, Jun. 1998.

Microsoft Product Support Services, "*WD98: How to Use (OLE) Automation with Word*", Article ID: Q184983, Last Reviewed Apr. 7, 2000.

Microsoft Product Support Services, "*INFO: Security Issues with Objects in ASP and ISAPI Extensions*", Article ID: Q172925, Last Reviewed Mar. 10, 2000.

* cited by examiner

*Primary Examiner*—Jack Choules
(74) *Attorney, Agent, or Firm*—Synnestvedt & Lechner LLP

(57) ABSTRACT

An information release notification is provided using an event manager, reports, information notification messages, an investor events database, and a personal computing device. The personal computing device and event manager are preferably implemented in a client-server architecture providing electronic messaging and web pages over an electronic network such as the Internet. The events manager receives new information releases from an external information service over the network. Information releases are stored in the investor events database and reviewed by the events manager for the occurrence of identifier symbols that uniquely correspond to a particular organization. The investor events database also includes information interest lists to associate notified users with a particular identifier symbol. When the event manager detects an identifier symbol contained on an information interest list, the event manager automatically transmits a converted information notification message to the personal computing devices of each interested user.

6 Claims, 20 Drawing Sheets

FIG.3

StreetEvents
A Service of CCBN.com

Help ▷
Feedback ▷

Search all 22521 events by ticker: [ ] ▷

| What's New | All Events | WatchList Events | WatchList Reports | My Calendar | Adv Search | My Profile | Logout |

User Name

Jan 5, 2000. 4:06pm ET

| WatchList | E-mail Notification | Contact Info |

Add Companies

Enter the tickers for the companies to be added to the WatchList.

[          ]

ADD ▷
◁ REMOVE
(Remove All)

My Companies

F - Ford Motor Company
LU - Lucent Technologies
OMPT - Omnipoint

Select Topics

Adding topics will result in notification of IPOs, investment conferences, and trade shows.
It will not add companies to your WatchList.

Aerospace/Defense
Automotive
Banking
Chemicals

ADD ▷
◁ REMOVE
(Remove All)

My Topics

Telecommunications

Select Event Types

All
Quarterly Earnings Release
Conference Call
Conference
Conference Presentation
Other ADD ▷
◁ REMOVE
(Remove All)

My Event Types

Quarterly Earnings Release
Conference Call
Conference
Conference Presentation
Other

FIG.5

Street Events
A Service of CCBN.com

Help ▷
Feedback ▷

Search all 22521 events by ticker: [ ] ▷

| What's New | All Events | WatchList Events | WatchList Reports | My Calendar | Adv Search | My Profile | Logout |

User Name
Jan 5, 2000. 4:07pm ET

| WatchList | E-mail Notification | Contact Info |

[ Reset ] [ Submit ]

| Field | Value |
|---|---|
| User name | AAAAA |
| Password | |
| Retype Password | |
| Email | username @ domain.com |
| Salutation | Mr. ▽ |
| First Name | |
| Last Name | |
| Role | Analyst ▽ |
| Title | |
| Address | |
| | |
| State | ▽ |
| City Name | |
| Zip Code | |
| Country | United States ▽ |
| Time Zone | ET ▽ |
| Tel. Number | |
| Fax Number | |
| Company | |
| Firm Type | Consultant ▽ |

IMPORTANT: You must click on the "Submit" button to save all changes to your Contact Info.

[ Reset ] [ Submit ]

User Name

From: Street Events [StreetEvents@streetevents.com]
Sent: Wednesday, January 05, 2000 10:24 PM
To: user @ domain.com
Subject: Street Events WatchList Update - Thurday, January 06, 2000

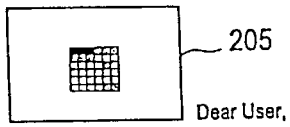
205

Dear User,

StreetEvents now provides First Call estimates!

Consensus estimates are displayed below the earnings release and conference call details of over 5,000 companies on StreetEvents.

To access true "one-stop shopping" for corporate earnings information, go to http://www.streetevents.com.

The new or modified events for companies in your profile are listed below:

---

Deutsche Banc Alex. Brown Media & Telecommunications Conference
Jun 5, 2000 to Jun 7, 2000
Description: By Invitation Only. Please contact your Deutsche Banc Alex. Brown representative for further information
Address: The Pierre
New York, NY
Contact Info: Deutsche Banc Alex. Brown
Last Updated: 1/5/00 9:22:15 AM ET

---

To change your profile or to unsubscribe to these e-mails, go to: http://www.streetevents.com This StreetEvents WatchList Update includes events in the vCalendar format. vCalendar events can be downloaded directly to Microsoft Outlook or any other vCalendar-compatible application.

To download a StreetEvent, simply double-click on the chosen event icon located at the bottom of this e-mail.
A window will pop up that allows you to view the event details.
Then click the "Save and Close" button in the upper left-hand corner.

If you have any questions, please contact your account executive or call:

Client Service Dept.
617.850-7969 x 7721

This message contains confidential information and is intended only for the use of the individual to whom it is addressed.
Any copying, distribution or disclosure is strictly prohibited.
If you have received this communication in error, please notify us immediately by e-mail: streetevents@streetevents.com

User Name

Subject: StreetEvents: Deutsche Banc Alex. Brown Media & Telecommunications Conference
Location: No Time Specified Start: Mon 6/5/00 5:00 AM
End: Wed 6/7/00 5:00 AM Recurrence: (none)

Description: By Invitation Only. Please contact your Deutsche Banc Alex. Brown representative for further information
Address: The Pierre
New York, NY Contact Info: Deutsche Banc Alex. Brown seID#26732

FIG.8

StreetEvents
A Service of CCBN.com

Help ▷
Feedback ▷

Search all 22521 events by ticker: [ ] ▷

| What's New | All Events | WatchList Events | WatchList Reports | My Calendar | Adv Search | My Profile | Logout |

User Name

Jan 5, 2000. 4:06pm ET

| WatchList | E-mail Notification | Contact Info |

Set E-mail Notifications

Would you like to receive daily e-mail notifications of new and modified events concerning companies in your WatchList?

- ⊙ Yes    (I would like to subscribe to StreetEvents e-mail notifications with vCalendar attachments)

- ○ Yes    (I would like to subscribe to StreetEvents e-mail notifications without vCalendar attachments)

- ○ No

E-mail [ User @ domain. com ]

New! StreetEvents now offers vCalendar attachments that can be downloaded directly into Microsoft Outlook 98 or 2000.

IMPORTANT: You must click on the 'Submit' button to save all changes to your Profile.

[ Reset ][ Submit ]

FIG.9

StreetEvents
*A Service of CCBN.com*

What's Happening on Wall Street

| Home | About Street Events | Corporate | Contacts | Employment |

*StreetEvents*, a service of CCBN.com, is an interactive master calendar of Wall Street events featuring earnings release, conference call, company presentation and brokerage conference information.

Investment and IR professionals request a password here: [GO]

4431 *StreetEvents*
Registered subscribers login:

Username: [     ]
Password: [     ] [GO]

Forgot your password? Click here.

*StreetEvents* Search

Company Ticker Lookup

Ticker: [     ] [GO]

*StreetEvents* Site Info

January 4, 2000
Online Investor Magazine gives StreetEvents an 8 out of 10 in its roundup of online resources. More...

December 21, 1999
"Investment Skinny" More...

December 20, 1999
"Online Conference Highlights" More...

December 3, 1999
Redchip.com Presents a WebCast Conference of Tomorrow's Tech Leaders Today More...

December 1999
Red Herring magazine profiles CCBN.com and StreetEvents in its December Issue More...

November 9, 1999
CCBN.com Signs 1,000th Client for Web IR Service More...

November 1999
"A New Web Monster For Company Data? Vendor Goads Silicon Valley Rival"-Traders Magazine More...

October 29, 1999
The Red Chip Review Presents a WebCast Conference on Eight Emerging Tech Companies More...

October 18, 1999
CCBN.com launches StreetEvents, a Web-based portal for Investment related event information More...

Individual Investor Center
Upcoming Earnings Releases

| Company Name | Ticker | Date | Time (ET) |
|---|---|---|---|
| Intimate Brands | IBI | 1-5 | 7:00am |
| Nautica Enterprises | NAUT | 1-5 | BMO |
| Nu Horizons Electronic | NUHC | 1-5 | BMO |
| Leap Wireless International | LWIN | 1-5 | AMC |

To listen to the multimedia event, click on the 🔊 [Full Page]

Online Conference Call Replays 🔊

| Company Name | Ticker | Date | Time (ET) | |
|---|---|---|---|---|
| A B Watley Group | ABWG | 11-9 | 5:00pm | 🔊 |
| AFLAC | AFL | 10-27 | 9:00am | 🔊 |
| Allied Capital | ALLC | 10-26 | 10:15am | 🔊 |
| Alysis Technologies | ALYS | 10-26 | 5:30pm | 🔊 |
| AMLI Residential Properties Trust | AML | 11-3 | 2:30pm | 🔊 |
| American Tower | AMT | 11-4 | 11:00am | 🔊 |

210

To listen to the multimedia event, click on the 🔊 [Full Page]

Legend
To listen to the multimedia event, click on the Icon:
 🎤 Live conference call webcast
 🔊 Online conference call replay Date and time abbreviations:
 \* Estimated date (the event will take place in the days following the indicated date)
 AMC After Market Closes
 BMO Before Market Opens

FIG.10A

StreetEvents
A Service of CCBN.com

Help ▷
Feedback ▷

Search all 22521 events by ticker: [ ] ▷ /215

| What's New | All Events | WatchList Events | WatchList Reports | My Calendar | Adv Search | My Profile | Logout |

User Name

Jan 5, 2000. 4:08pm ET

| Upcoming WatchList Events | New WatchList Events | 📞🔊 Upcoming WatchList Audio |

Sort By: [Date Time ▼]

○ Salomon Smith Barney 10th Annual Entertainment, Media & Telecom Conference
Jan 9, 2000 to Jan 13, 2000 *Palm Springs, CA*

○ Morgan Stanley Dean Witter Broadband 2000: CTOs Unplugged Conference
Jan 18, 2000 *New York, NY*

○ LU - Lucent Technologies Earnings Release
Estimated date range: Jan 18, 2000 - Jan 21, 2000

○ C.E. Unterberg, Towbin Satellite Conference
Jan 25, 2000 *New York, NY*

○ C.E. Unterberg, Towbin Broadband Conference
Jan 26, 2000 *New York, NY*

○ F - Ford Motor Company Earnings Release
Jan 26, 2000

○ OMPT - Omnipoint Earnings Release
Estimated date range: Feb 14, 2000 - Feb 19, 2000

○ ING Barings Satellite Industry Conference
Mar 1, 2000 to Mar 2, 2000 *New York, NY*

○ Credit Suisse First Boston Global Telecom CEO Conference
Mar 3, 2000 to Mar 10, 2000 *New York, NY*

○ Morgan Stanley Dean Witter Global Telecom Conference
Mar 29, 2000 to Mar 31, 2000 *New York, NY*

○ Banc of America Securities Growth Telecom, Media & Entertainment Conference
May 15, 2000 to May 17, 2000 *New York, NY*

○ Deutsche Banc Alex. Brown Media & Telecommunications Conference
Jun 5, 2000 to Jun 7, 2000 *New York, NY*

○ CIBC World Markets Communications Food Chain Conference
Jun 12, 2000 to Jun 14, 2000 *New York, NY*

○ ING Barings Media & Communications Conference
Sep 20, 2000 to Sep 22, 2000 *New York, NY*

1-14 of 14 Events

FIG.10C

Street Events
A Service of CCBN.com

Help
Feedback
Search all 22521 events by ticker: [ ]

| What's New | All Events | WatchList Events | WatchList Reports | My Calendar | Adv Search | My Profile | Logout |

User Name
Jan 5, 2000. 4:09pm ET

◁ January, 2000 ▷       Day | Week | ◁Month▷        Time Zone: ET ▼

List View

January, 2000

| January | February |
| March | April |
| May | June |
| July | August |
| September | October |
| November | December |

(Today)

Go to a specific date by entering in the date

[           ] (Go)
(mm/dd/yy)

| Sunday | Monday | Tuesday | Wednesday | Thursday | Friday | Saturday |
|---|---|---|---|---|---|---|
|  |  |  |  |  |  | 1 |
| 2<br>✗ Conf | 3 | 4 | 5 | 6 | 7 | 8 |
| 9 | 10 | 11<br>✗ Conf<br>✗ LU | 12 | 13 | 14 | 15 |
| 16 | 17 | 18 | 19<br>✗ Conf | 20 | 21 | 22 |
| 23 | 24<br>✗ Conf | 25<br>✗ F | 26 | 27 | 28 | 29 |
| 30 | 31 |  |  |  |  |  |
| Sunday | Monday | Tuesday | Wednesday | Thursday | Friday | Saturday |

BMO: Before Market Opens
AMC: After Market Closes
NTS: No Time Specified
✗: Remove from Calendar The Calendar can be viewed by month, week or day. You can also change the time zone in which you view all of your events.

FIG.10D

StreetEvents
A Service of CCBN.com

Help
Feedback

Search all 22522 events by ticker: [ ]

| What's New | All Events | WatchList Events | WatchList Reports | My Calendar | Adv Search | My Profile | Logout |

User Name
Jan 5, 2000. 4:10pm ET

[ Find Event ]

Search My WatchList

Event Type: [--------- All ---------▼]

Event Date:
From: [1/5/00] mm/dd/yy
To: [ ] mm/dd/yy

[Clear Form] [Search]

Search By Company

Company:
(•) Ticker: [ ]
( ) Name: [ ]

Event Name: [ ]

Event Type: [--------- All ---------▼]

Event Date:
From: [1/5/00] mm/dd/yy
To: [ ] mm/dd/yy

[Clear Form] [Search]

Search For Conferences

Sponsor Name: [ ]

Event Name: [ ]

Topic: [--- Not Specified ---▼]

Event Date:
From: [1/5/00] mm/dd/yy
To: [ ] mm/dd/yy

[Clear Form] [Search]

E-Mail Alert Service
Welcome back! You can edit your information below or just select the lists that you would like to be added to or removed from.

JoinMail Alert Selection

Please choose the Alert categories that interest you. To subscribe to that category, check the box next to its name.

"Company A" Calendar Event Alert
    "Company A" Press Release Alert
    "Company A" Financial Report Alert
    "Company A" SEC Filing Alert

[ Submit my changes ]

NOTE: *BOLDED field names are *required!*

\*EMAIL: smarsh@ccbn.com
    \*NAME: _____ _____ _____
             (first)  (init.)  (last)
    \*TITLE: _____
    \*COMPANY: _____
\*CLASSIFICATION: - select one - ▼

Address 1: _____
Address 2: _____
City: _____ State: _____
Zip: _____
Country: _____
Phone: _____ (Extension)
Fax: _____

✔ Check this box to be notified by fax when we add fax capabilities.

[ Submit my changes ]

```
<b>
            "Company A" New Product Announcement
</b>
<p>

LAS VEGAS-- (BUSINESS WIRE) --May 11, 2000 - Company A (NYSE: COA
Networks Division, the leader in access solutions, today announced that the Model 65,
an intelligent router, is the first such device to be selected by "Company B" (NYSE:
COB) for its Service offering.

</p>
<p>
"Company A is pleased that our Model 65 has been selected by Company B based on
their performance features and capabilities" said the vice president of Company A.
"Designed specifically for service providers like Company B, the Model 65 solution is
easy to install, configure, and manage, which are critical factors in meeting the needs of
service providers, especially in large volume environments where ease-of-use and
mass deployment can be critical cost and service factors."

From: CCBN Alert [mailto:COA_ir-news@joinmail.ccbn.com]
Sent: Thursday, May 11, 2000 10:19 AM
To: COA_ir-news
Subject: Company A New Product Announcement "Company A" has added the following News Release to its Investor Relations web site.

Company A New Product Announcement
Date: 5/11/2000 10:03:00 AM

For a complete listing of our News Releases visit:
http://www.corporate-ir.net/ireye/ir_site.zhtml?ticker=coa&script=400

LAS VEGAS-- (BUSINESS WIRE) --May 11, 2000--Company A (NYSE: COA Networks Division), the leader in access solutions, today announced that the Model 65, an intelligent router, is the first such device to be selected by "Company B" (NYSE: COB) for its Service offering.

"Company A" is pleased that our Model 65 has been selected by Company B based on their performance features and capabilities" said the vice president of Company A. "Designed specifically for service providers like Company B, the Model 65 solution is easy to install, configure, and manage, which are critical factors in meeting the needs of service providers, especially in large volume environments where ease-of-use and mass deployment can be critical cost and service factors."

FIG. 18

# INVESTOR RELATIONS EVENT NOTIFICATION SYSTEM AND METHOD

This application is a continuation-in-part of U.S. application Ser. No. 09/493,075, filed Jan. 28, 2000.

A portion of this disclosure contains material which is subject to copyright protection. The copyright owner has no objection to the facsimile reproduction by anyone of the patent document or patent disclosure, as it appears in the Patent and Trademark Office file or records, but otherwise reserves all copyright rights whatsoever.

BACKGROUND OF THE INVENTION

1. Field of the Invention

The present invention relates generally to event scheduling and management using electronic networks, and, more specifically, to providing automated scheduling and notification of investor relations events using electronic networks.

2. Background

Organizations that rely on financing through publicly traded securities benefit from timely and accurate dissemination to members of the investment community who follow its stocks and securities of new information potentially affecting their financial position, and, consequently, the market valuation for their securities. Publicly-held corporations, for example, are required to periodically report certain information regarding financial condition in compliance with financial disclosure and reporting requirements imposed by federal law, including applicable securities regulations. Securities analysts must factor into consideration the latest financial information from a corporation in order to produce a market price prediction over time for the corporation's stock or security. This market price prediction is useful and valuable to the analysts' clients. The economic value of an analysts' security valuation prediction increases as the accuracy of the prediction increases. Further, the overall process of adjusting and reflecting the effect of material information in the price of a given security is also key to the efficient functioning of the capital markets in which the organization's securities are traded.

However, this dissemination activity imposes a burden on the reporting organization's resources. In the corporate context, for example, this burden may be borne by investor relations personnel, the chief financial officer, or other person, employee, or group. It would therefore be advantageous to provide a system and method that automatically manages the dissemination of investor information, thereby reducing the resource burden on the reporting organization.

Moreover, obtaining and verifying financial and related information from reporting organizations imposes a burden on the analyst. The analyst's burden is compounded by the fact that any one particular analyst usually follows and monitors information released by several such reporting organizations. For example, one analyst may have to track and monitor the financial disclosures from each significant competitor in a given industry group, product category, or market segment in order to gauge the affects of competition on the market price of a followed security. Ideally, the analyst will attend meetings held by the reporting organization to directly obtain clarifying or explanatory information in the form of answers to questions posed to officers representing the organization. However, since quarterly financial reporting period end dates for many organizations coincide, this-goal is often difficult to achieve due to conflicting meeting schedules.

In general, the more analysts that follow an organization's securities, the more the organization benefits in terms of the market price for its securities. Coverage by more analysts increases market awareness of the organization's securities and thereby increases demand for them. It is thus in the best interests of the organization to actively manage the scheduling of investor relations events in order to avoid the occurrence of conflicting. events that could dilute analysts' interest.

It is also in the best interests of the organization that the information provided to analysts and to the investing public is accurate and timely available. The rapid dissemination and-assimilation of new information underlies the efficient functioning of the financial markets.

SUMMARY OF THE INVENTION

Therefore, it is an object of the present invention to provide a system and method that determines and reports a set of scheduled investor relations events that are proximate in time to a proposed scheduled investor relations event, thereby making available to the person or organization proposing the new event information that is helpful to avoiding conflicts in the scheduling of new events.

It is a further object of the present invention to provide a system and method that supports reliable and timely dissemination of investor relations information and events.

It is a still further object of the present invention to provide a system and method that automatically notifies one or more interested persons or groups of new information concerning a particular organization. The new information may be that provided by the organization itself or by third parties. This information is disseminated in a timely and accurate manner.

It is a still further object of the present invention to provide new information, including news or press release information, in a manner useful to the recipient.

These as well as other objects of the present invention will be apparent to those of skill in the art upon inspection of this specification and the drawings herein.

BRIEF DESCRIPTION OF THE DRAWINGS

FIG. 3 is a preferred embodiment of an interactive web page for entering a watchlist;

FIG. 5 is a preferred embodiment of an interactive web page for entering a personalization data;

FIG. 6 is an example of a preferred embodiment of an email event notification message;, FIG. 7 is an example of a preferred embodiment of a vCcalendar file attachment;

FIG. 8 is a preferred embodiment of an interactive web page useful for allowing a user to indicate whether or not to automatically receive a vCalendar file attachment and an email event notification message;

FIG. 9 is an example of a home web page provided by a preferred embodiment of the present invention;

FIG. 10a is an example of a preferred embodiment of 110 a report providing a list of upcoming watchlist events;

FIG. 10c is an example of a preferred embodiment of a personal calendar showing dates of events for each organization contained in a watchlist;

FIG. 10d is an example of a preferred embodiment of an advanced event searching capability;

FIG. 15 is an interactive web page provided by a preferred embodiment of the present invention by which a user may request to receive information notification messages associated with one or more types of events for a particular organization;

FIG. 17 is an example of the contents of an information release for use with the present invention; and FIG. 18 is an example of an information notification message produced by system and method of the present invention, corresponding to the information release of FIG. 17.

DETAILED DESCRIPTION OF THE PREFERRED EMBODIMENTS

The present invention comprises a system and method for the automated management and dissemination of investor relations event scheduling and other information.

Figure 1:
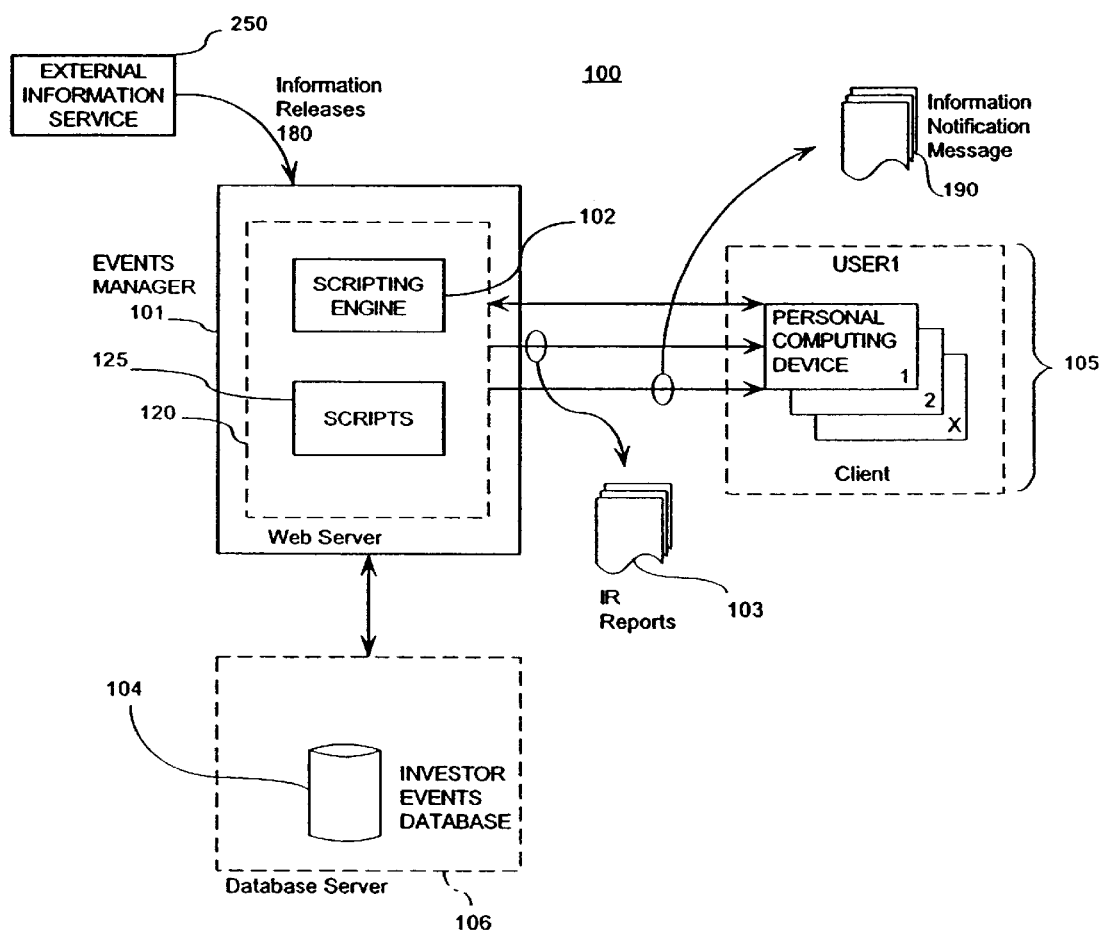
FIG. 1 is a functional block diagram of a preferred embodiment of a system according to the present invention.

In a preferred embodiment, an event scheduling and notification system 100 comprises an events manager 101, IR reports 103, a database server 106, information notification messages 190, and a personal computing device 105 as shown in FIG. 1. An event scheduling system is also described in parent U.S. patent application Ser. No. 09/493,075, filed Jan. 28, 2000, also assigned to CCBN.com, Inc., the entire disclosure of which is hereby incorporated by reference into this specification.

Event scheduling and notification system 100 is preferably implemented in accordance with the client-server architecture as shown in FIG. 1 for transmitting and receiving electronic messages and serving worldwide web pages over an electronic network such as the Internet. Client users interact with event scheduling and notification system 100 using web browser enabled and electronic mail enabled personal computing device 105.

Personal computing device 105 is preferably a personal computer (PC) running a web browser application such as, but not limited to, Microsoft® Internet Explorer™, and an electronic mail application such as, but not limited to, Microsoft® Outlooks™. However, personal computing device 105 may be any web browser or electronic mail enabled electronic appliance, such as, but not limited to, a personal organizer. In a preferred embodiment, personal computing device 105 and events manager 101 communicate by transmitting and receiving electronic messages over an electronic network, such as the Internet, in accordance with the Hypertext Transport Protocol (HTTP) and Simple Mail Transport Protocol (SMTP).

Referring again to FIG. 1, events manager 101 includes a web server 120, a scripting engine 102, and scripts 125. Events manager 101 includes business logic required to effect the operation of event scheduling and notification system 100 as described herein.

Web server 120 receives electronic messages from personal computing devices 105 and transmits to the personal computing devices 105 of interested users electronic messages and web pages or frames containing information pertaining to the scheduling of investor relations events. In a presently preferred embodiment, web server 120 is implemented using the Internet Information Server (IIS) web server application provided by Microsoft® Corporation. Detailed information concerning use of IIS for web applications may be found in industry publications such as the development guidelines provided online at "http://www.microsoft.com/NTServer/web/deployment/planguide/WebAppDev.asp" published by Microsoft® Corporation.

Scripts 125 include: (1) Scripts 125 to extract information from HyperText Markup Language (HTML) forms received by events manager 101, (2) Scripts 125 to generate web pages comprising IR reports 103 containing content retrieved from investor events database 104 to be transmitted by events manager 101 to users via personal computing devices 105, and (3) Scripts 125 to generate information notification messages 190.

In a preferred embodiment, scripting engine 102 is implemented as an Active Server. Pages (ASP) scripting environment. In alternative embodiments, scripting engine 102 is implemented using another language such as, but not limited to, Java, C++, JavaScript™, PERL, or Virtual Basic® Script (VBScript). Scripting engine 102 and scripts 125 provide means for events manager 101 to access information contained in investor events database 104; other embodiments providing such database access means are possible and are to be included within the scope of the present invention.

Events manager 101 and scripting engine 102 are preferably implemented in accordance with the Microsoft® Windows NT™ Server environment for a personal computer workstation. In a preferred embodiment, events manager 101 and scripting engine 102 include a Windows™ based personal computer platform manufactured by the Dell Computer Corporation.

In a preferred embodiment, database server 106 comprises an investor events database 104 which is a relational database management system that stores and retrieves information as directed by scripting engine 102. Scripting engine 102 executes the programmed instructions contained in one or more scripts 125. In a preferred embodiment, scripts 125 are maintained in non-volatile storage at web server 120. Alternatively, scripts 125 are maintained in non-volatile storage at database server 106. Generally, scripts 125 may be maintained using any local or remote non-volatile storage means accessible to events manager 101. Scripts 125 executed by scripting engine 102 thereby control the storage and retrieval of information contained in investor events database 104.

Figure 2:
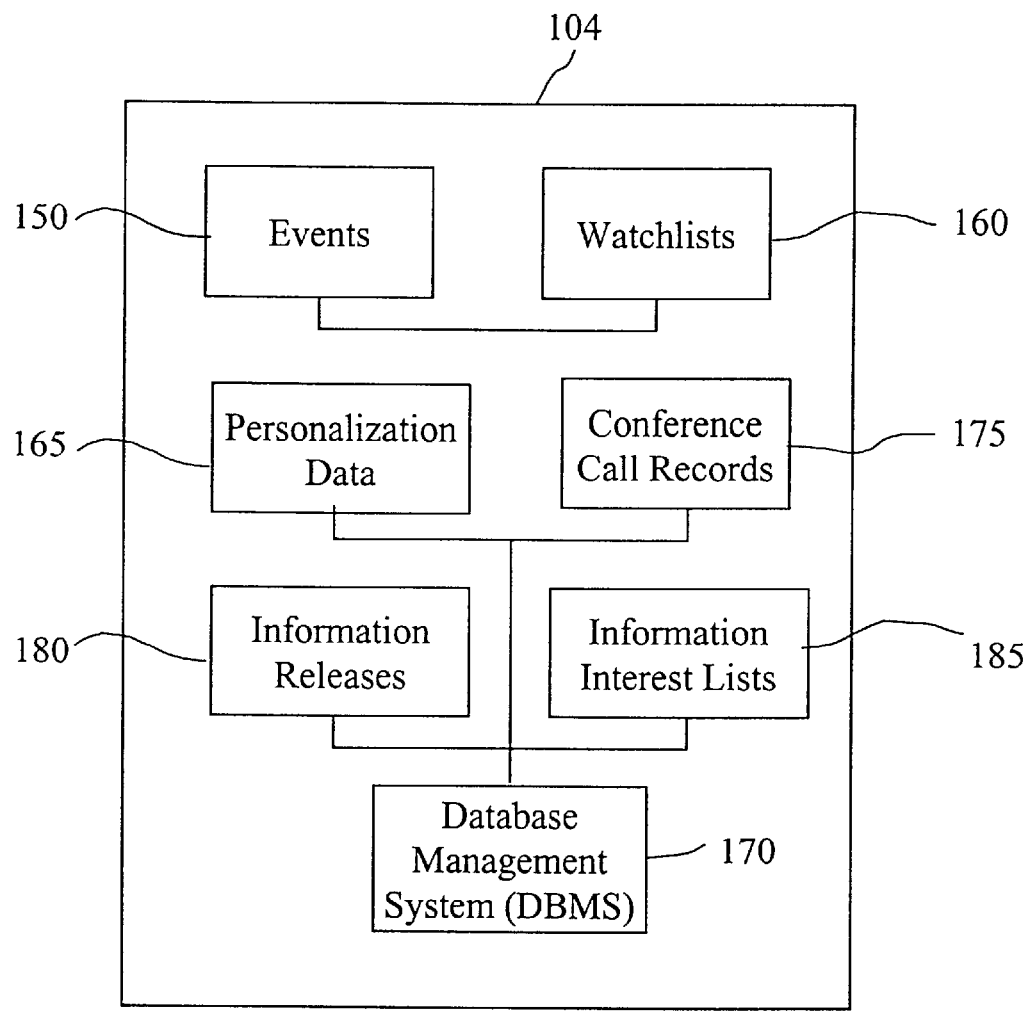
FIG. 2 is a description of information contained in an investor events database according to the present invention.

In a preferred embodiment, illustrated in FIG. 2, investor events database 104 includes events 150, watchlists 160, personalization data 165, database management system 170, archived audio conference call records 175, information releases 180, and information interest lists 185. Information contained in investor events database 104 may be indexed, sorted, or accessed by a variety of attributes including, but not limited to, the name of the organization with which the information record is associated. Alternatively, a unique identifier may be used to distinctly identify each organization for this purpose (e.g., stock ticker, or other numeric, alphabetic, or alphanumeric identifier). In a preferred embodiment, database management system (DBMS) 170 is an SQL server application such as, but not limited to, Microsoft® SQL Server™ 7.0 running on a personal computer workstation.

An event 150 is a database record comprising fields of information describing various aspects of an investor relations event for a particular organization. Event 150 information fields include, but are not limited to, the description, date, time, and location of the event.

Events 150 contained in investor events database 104 are preferably stored and maintained in conformance with the Structured Query Language (SQL) database standard. In addition to storing and retrieving events 150, scripting engine 102 also converts retrieved events 150 to comply with the vCalendar file format (i.e., ".vcs" files). Scripting engine 102 accomplishes this conversion by invoking the appropriate SQL procedure calls to database management system 170 of investor events database 104 in accordance with the instructions contained in an executing script 125.

A watchlist 160 is a database record comprising fields of information identifying one or more organizations for which investor relations events are of interest to a particular user. Watchlists 160 are useful for identifying one or more particular organizations for which event scheduling and notification system 100 manages and advises the user of the existence of scheduled investor relations events 150. Watchlist 160 also provides the basis for event scheduling conflicts processing as further described herein. Watchlists 160 are also useful for monitoring the scheduling of investor relations events 150 associated with competitors, industry or market segment leaders, or other organizations of interest, as well as for identifying conflicts between a proposed to-be-scheduled event 150 for a watchlist 160 organization and the previously scheduled events 150 for competitors, industry or market segment leaders, or other organizations of interest also contained in watchlist 160. A user of event scheduling and notification system 100 establishes a watchlist 160 by selecting one or more organizations using an interactive web page and the web browser of personal computing device 105. A preferred embodiment of an interactive web page useful for entering a watchlist 160 is shown in FIG. 3.

In an alternative embodiment, events manager 101 determines additional entries for watchlist 160 by selecting a set of organizations based on degree of fit to a particular set of criteria based on a particular organization already contained in a user's watchlist 160. These criteria may include, but are not limited to, industry segment, market segment, market position, product attributes, or service attributes.

Figure 4:
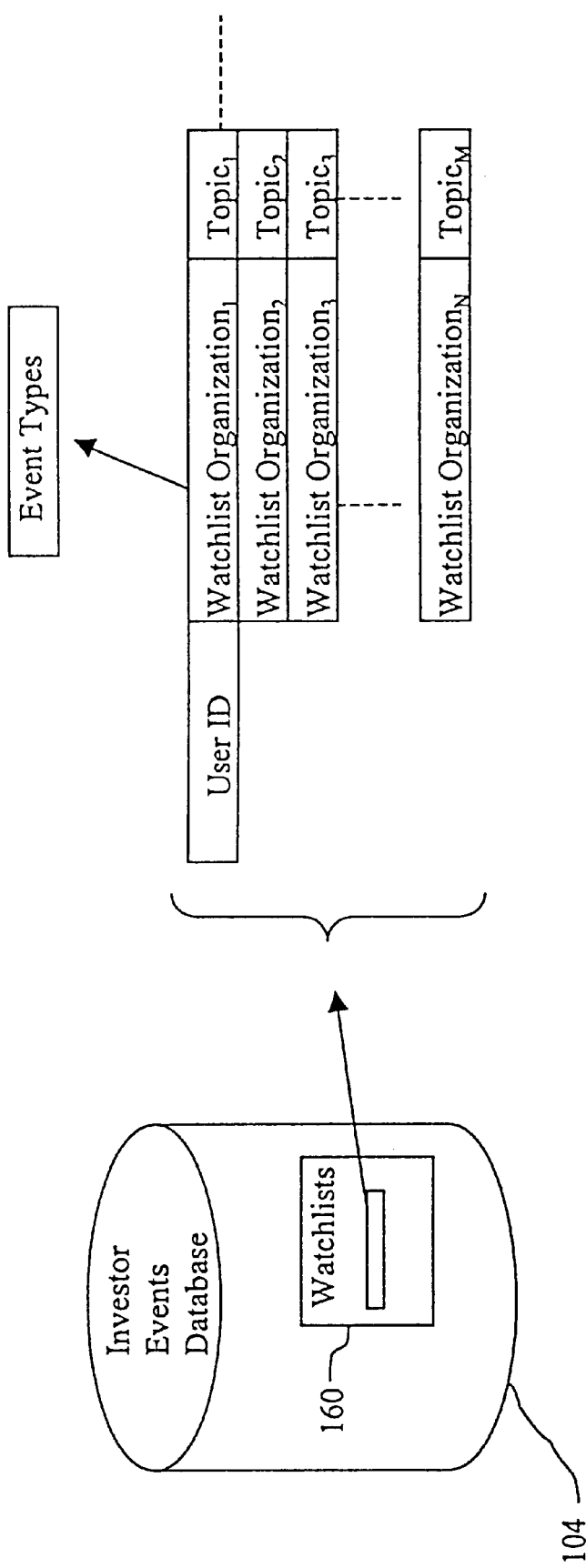
FIG. 4 is a description of the information associated with a watchlist contained in a preferred embodiment of an investor events database.

Further description of the arrangement of watchlist 160 information contained in investor events database 104 is described in FIG. 4.

Personalization data 165 includes user-specific information useful for events manager 101 to provide personalized interactive web pages to a particular user. Personalization data 165 for a particular user includes, but is not limited to, a user identifier (which may be the user's name or other unique identifier), an access password assigned to the user by events manager 101, and contact information. A preferred embodiment of an interactive web page useful for entering personalization data 165 is shown in FIG. 5.

Information releases 180 include text files containing HyperText Markup Language (HTML) and/or Extensible Markup Language (XML) encoded data received by events manager 101 from an organization or an-external information service 250 via an electronic network. Information releases 180 typically include press release text information, but may include any information of interest with respect to a particular organization.

Information interest lists 185 associate one or more recipient users with a particular organization. A recipient user is a user of event scheduling and notification system 100 who has indicated (preferably using a join mail list) that events manager 101 is to transmit information notification messages 190 for a particular organization to that user. An information interest list 185 for a particular organization may include, without limitation, the name or other identification of the organization, and one or more names of recipient users, including each recipient user's email address.

In a preferred embodiment, IR reports 103 are provided in the form of interactive web pages generated by events manager 101 and transmitted to personal computing devices 105 by events manager 101. To generate an IR report 103, events manager 101 accesses events 150, watchlists 160, and personalization data 165 by transmitting requests to and receiving data from scripting engine 102. In a preferred embodiment, events manager 101 requests are provided in the form of object oriented commands and messages in accordance with, for example, the ActiveX Data Objects (ADO) model, directed to accessing objects contained in investor events database 104. ADO is an object-oriented information access model that supports access to objects contained in a relational database independent of a particular computing platform. In a preferred embodiment, events manager 101 communicates with investor events database 104 in accordance with the Microsoft® Online Database Connectivity (ODBC) standard. Alternatively, events manager 101 accesses records and information contained in investor events database 104 using Javasoft™ Java Database Connectivity (JDBCT™) commands and messages.

Further, in a most preferred embodiment, when a new event 150 is entered into investor events database 104 for an organization listed on one or more watchlists 160, events manager 101 automatically transmits an SMTP-formatted email event notification message 200 to the personal computing device 105 of each user associated with a watchlist 160 containing the reporting organization. An example of a preferred embodiment of an email event notification message 200 is shown in FIG. 6. Email event notification message 200 is transmitted to the user's email address as specified in personalization data 165 and is displayed to the user by the email application of personal computing device 105.

Email event notification message 200 preferably contains a vCalendar file attachment 205 (i.e., ".vcs" file) to allow the recipient user to import the new event 150 schedule information into a personal online calendar using personal computing device 105. The vCalendar standard specifies a file format facilitating importation of information into scheduling applications such as, but not limited to, Microsoft Outlooks™. The vCalendar specification provides a formatting definition useful for exchanging calendaring and scheduling information between scheduling application programs, such as those commonly used with personal computers and organizers. An example of a preferred embodiment of a vCalendar file attachment 205 is shown in FIG. 7 (for the example email event notification message 200 of FIG. 6). A preferred embodiment of an interactive web page useful for allowing a user to choose whether or not to automatically receive vCalendar file attachment 205 and email event notification message 200 is shown in FIG. 8. In a most preferred embodiment, event scheduling and notification system 100 provides the capability for the user to choose to receive additional types of email notification messages including, but not limited to, daily or weekly event reminders.

IR reports 103 are useful for presenting event 150 scheduling information to a user. To receive an IR report 103 using scheduling system 100, in a preferred embodiment, a user enters the Uniform Resource Locator (URL) associated with the Internet address of web server 120 (e.g., "www.streetevents.com") into the web browser of the user's personal computing device 105. Personal-computing device 105 then transmits an HTTP-formatted message to events manager 101 requesting the web page designated in the URL. Events manager 101 then establishes an Internet session with personal computing device 105 (i.e., session-layer connectivity is established between events manager 101 and personal computing device 105, independent of the underlying transport, data link, and physical layer protocols). Upon receipt of this web page request message, events manager 101 requests scripting engine 102 to execute the appropriate ASP script to generate the requested interactive web page from the information contained in investor events database 104 as described elsewhere herein. The web page thus generated is then transmitted by events manager 101 to the requesting personal computing device 105 in accordance with the HTTP messaging protocol. Personal computing device 105 then displays the interactive web page containing the associated IR report 103 via web browser.

Event scheduling and notification system 100 also provides the capability to automatically notify users of newly-published information concerning a particular organization such as, but not limited to, press release information. Such new information releases 180 may be generated by the organization, other groups associated with the organization, or by reliable third party organizations (such as, for example, a news reporting organization) deemed by the organization to be a trusted source of information. Further, the present invention provides ASCII-formatted text versions of the contents of the newly-published information to certain users who wish to receive them, thereby saving these notified users time and effort in accessing and converting the web-formatted information.

Referring again to FIG. 1, events manager 101 receives new information releases 180 from at least one external information service 250. Each information release 180 includes an identifier symbol 195 (not shown) that uniquely corresponds to a particular organization contained in investor events database 104. In a preferred embodiment, identifier symbol 195 is the stock ticker symbol used in trading of the organization's securities on a public exchange or system. However, any symbol useable to uniquely identify a particular organization may serve as identifier symbol 195 as described herein and such variations are to be included within the scope of the present invention.

External information service 250 preferably transmits all information releases 180 to events manager 101 using an electronic network such as, but not limited to, the Internet. In a preferred embodiment, external information service 250 transmits information releases 180 to events manager 101 via a constant Internet connection (between external information service 250 and events manager 101) in accordance with the HTTP and Secure Socket Layer (SSL) protocols. Examples of external information service 250 include, but are not limited to, the MediaXpress™ news and information "feed" service provided by Wavo™ Corporation, and the Internet-based news release service provided by Business Wire.com™. An example information release 180 is shown in FIG. 17.

In a preferred embodiment, each information release 180 is transmitted and received as a file over the Internet in accordance with the File Transfer Protocol (FTP), and containing news information text and including HyperText Markup Language (HTML) and Extensible Markup Language (XML) encoded information. Each received information release 180 is stored in investor events database 104.

A user who wishes to be notified of information concerning the release of one or more particular types of information concerning a particular organization (i.e., a "notified user") preferably provides this indication to event scheduling and notification system 100 using an interactive web page as described earlier herein and as illustrated in FIG. 15. In a preferred embodiment, the user enters the following, without limitation, into the data entry fields of an interactive web page: his email address, name, title, company, and classification. Events manager 101 then causes this received information to be stored in investor events database 104. In particular, the notified user is placed on the information interest list 185 that associates one or more notified users with a particular organization, for each indicated organization. In a preferred embodiment, information interest list 185 comprises a join mail list. If an information interest list 185 does not exist for a particular organization, events manager 101 causes a new information interest list 185 to be added to investor events database 104. Events manager 101 controls these database operations by causing scripting engine 102 to execute scripts 125 that perform these functions as described elsewhere herein.

Events manager 101 reviews the message text of each information release 180 received from external information service 250 for the presence of one or more identifier symbols 195. If events manager 101 detects an identifier symbol 195 corresponding to an organization of interest (as indicated by its being listed in at least one information interest list 185), then events manager 101 converts the contents of that information release 180 from HTML-format or XML-format to ASCII text format. Events manager 101 then causes an information notification message 190 to be transmitted via electronic mail message (via Simple Mail Transport Protocol (SMTP)) to the personal computing device 105 of each notified user for the concerned organization as determined by the information interest list 185 associated with the organization. In a preferred embodiment, events manager 101 includes the converted ASCII text formatted information in the body of information notification message 190. Alternatively, events manager 101 attaches a file containing the converted ASCII text formatted information to information notification message 190.

Figure 16:
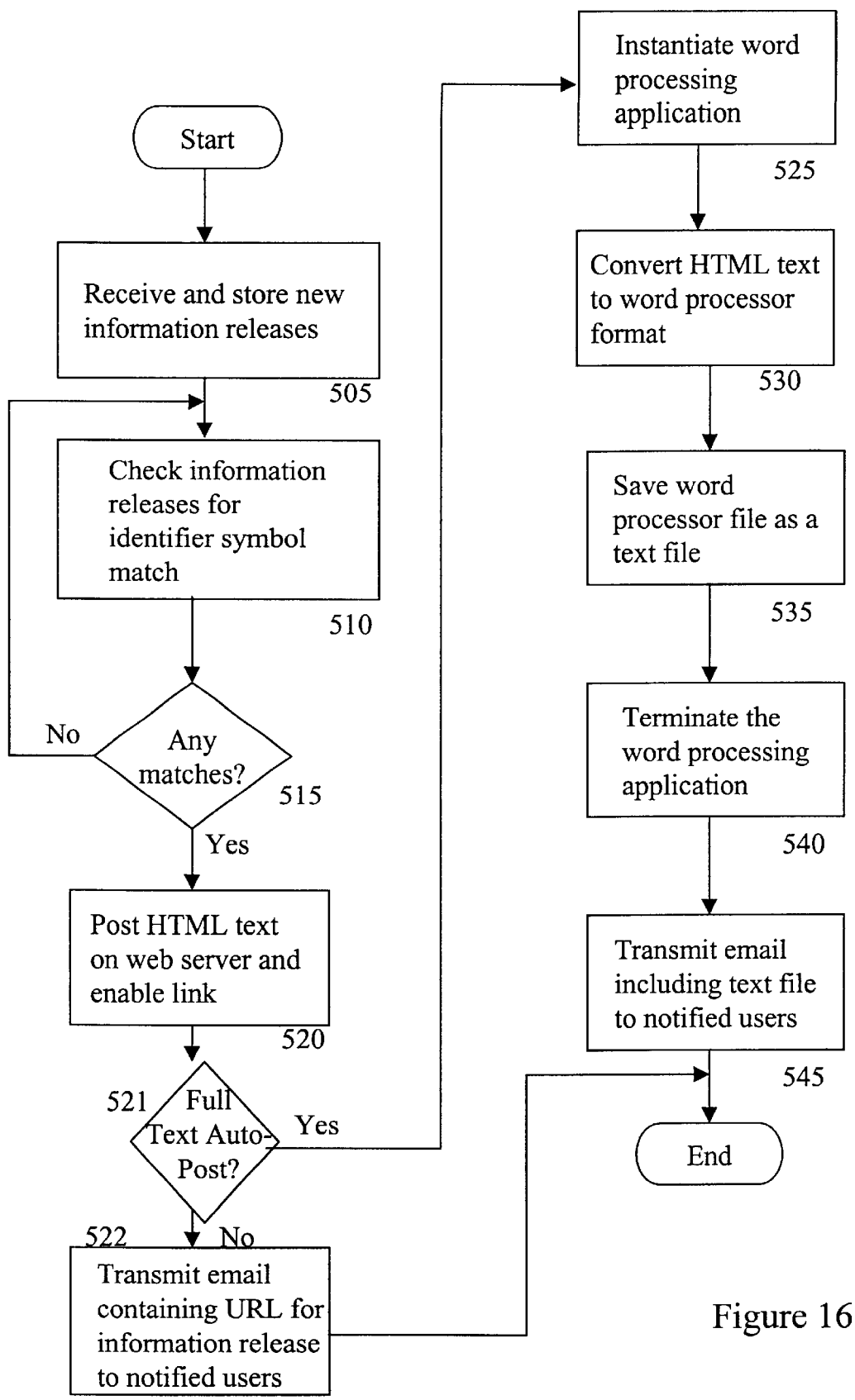
FIG. 16 is a flow diagram description of an automated information notification method according to the present invention.

This automated information notification operation is described in more detail as follows. Referring now to FIG. 16, events manager 101 receives new information releases 180 from at least one external information service 250 or directly from the subject organization itself (block 505). Information releases 180 preferably contain text and Hyper-Text Markup Language (HTML) and Extensible Markup Language (XML) encoded information. Each information release 180 includes one or more identifier symbols 195 (not shown), each of which uniquely corresponds to a particular organization contained in investor events database 104. Events manager 101 causes each received information release 180 to be stored in investor relations database 104 at the time it is received.

Referring again to FIG. 16, events manager 101 reviews the message contents of each information release 180 received from external information service 250 for the presence of one or more identifier symbols 195 (block 510). Preferably, events manager 101 determines the presence of one or more identifier symbols 195 by reviewing the XML-encoded information contained in information release 180, and, further, events manager 101 reviews the text portion of information release 180 to determine the presence of the associated organization name as a secondary check for accuracy. Alternatively, events manager 101 determines the presence of one or more identifier symbols 195 by reviewing the text contained in information release 180.

In a preferred embodiment, events manager 101 periodically checks for new received information releases 180 to review according to a pre-defined programmable inspection interval value. In a preferred embodiment, the inspection interval value specifies an information release 180 check frequency of once every two minutes, or, an inspection interval of two minutes. Alternatively, events manager 101 could perform this check for new messages at a lower frequency, a higher frequency (including a frequency approaching real-time response), aperiodically, or upon receipt of a control message commanding the new message check.

A Upon detecting the occurrence of an identifier symbol 195, events manager 101 determines the identification of the corresponding organization and further determines whether that organization is contained in one or more information interest lists 185. If events manager 101 does not detect a match condition (block 515), then events manager 101 waits until the expiration of the time remaining in the current inspection interval and then repeats the information release 180 check as described in block 510. If events manager 101 determines a match condition (block 515), then events manager 101 performs the following:

a. Makes the received information release 180 available to users accessing event scheduling and notification system 100 (block 520). In a preferred embodiment, this is accomplished by posting the received information release 180 to web server 120 and enabling an HTTP link to web server 120 associated with retrieval of the posted information release 180. Information interest list 185 may further include a flag variable that is set to indicate to events manager 101 to automatically post (i.e., "auto-post") received information releases 180 for that organization.

b. In block 521, if the client organization associated with information release 180 has not requested full-text auto-post, then events manager 101 causes an email message containing the posted information release 180 URL (reference block 520) to be transmitted (via Simple Mail Transport Protocol (SMTP)) to the personal computing device 105 of each notified user for the concerned organization as determined by the information interest list 185 associated with the organization (block 522). If the client organization associated with information release 180 has requested full-text auto-post, then events manager 101 proceeds to produce an information notification message 190 as follows beginning at block 525. Events manager 101 preferably maintains a flag variable in investor events database 104 indicating whether or not the client organization has full-text auto-post.

c. If the client organization associated with information release 180 has requested full-text auto-post, then events manager 101 next instantiates or executes a word processing application into which the information release 180 is imported as a file (block 525). In a preferred embodiment, the Microsoft® Word word processing application is used, executed by the web server 120 computing platform of events manager 101. The word processing application runs as an object on web server 120. In order to instantiate and run the word processing application at web server 120, it is necessary to configure the permissions for the word processing application object in a manner that allows it to be accessed and launched by the server application. In a preferred embodiment using Microsoft® Word as the word processing application, the "DCOMCNFG" utility is used to permission the Word object to run as an IIS anonymous user object accessible by the server application. Further information concerning how to configure the word processing application object can be found at the following world wide web address:

"http://support.microsoft.com/support/kb/articles/Q172/ 9/25.ASP?LN=EN~US&SD=gn&FR=0."

d. Once the information release 180 has been imported into the word processing application, events manager 101 converts the contents of the information release 180 from HTML-format or XML-format to the proprietary format of the word processing application (block 530).

e. Once the information release 180 has been converted to the word processing application file format, events manager 101 then saves the contents of information release 180 as a American Standard Code for Information Interchange (ASCII) text formatted information notification message 190, using the word processor application (block 535). Information notification message 190 is stored in investor events database 104.

f. After information notification message 190 is saved, events manager 101 terminates the word processor application (block 540).

Next, events manager 101 causes information notification message 190 to be transmitted via electronic mail message (via Simple Mail Transport Protocol (SMTP)) to the personal computing device 105 of each notified user for the concerned organization as determined by the information interest list 185 associated with the organization (block 545). Events manager 101 transmits information notification message 190 to each notified user identified and associated with the corresponding organization as specified by the information interest lists 185 contained in investor information database 104. Events manager 101 transmits the information notification message 190 to the email address provided by the user at the time the user adds his name to the join mail list. In a preferred embodiment, information notification message 190 is transmitted via SMTP protocol over the Internet. FIG. 18 provides an example of an information notification message 190 corresponding to the exemplary information release 180 of FIG. 17.

The following is a pseudocode implementation of a preferred embodiment of the automated information notification process described in FIG. 16:

```
For each news release
    Get list of unique tickers
    Eliminate tickers that are not live
    If # of tickers > 0 then
        If # of tickers > 1 then
            For each ticker
                Check for source match
            Next
            If found only 1 source match then
                Eliminate other tickers
                Flag as processable
```

-continued

```
        Else
            Flag as non-processable
        End If
    Else
        If source match then
            Flag as processable
        Else
            Flag as non-processable
        End If
    End If
    If processable or "C O R R E C T I O N" in title then
        If company is live CCBN client then
            Trim extraneous header and footer data from
                HTML file
            If release has "C O R R E C T I O N" in title
                then
                E-mail notification w/attached HTML file
                    to Client Services
            ElseIf title exists in DB and is < 7 days old
                then
                Update existing record in DB
            Else
                If client has auto-post then
                    Update release to DB with "live"
                        status
                    E-mail notification to Client Services
                    If client has an "ir-news" alert list
                        then
                        If client includes full text in e-
                            mail body then
                            Format HTML as plain text
                            E-mail mass mail request to
                                UnityMail
                        Else
                            E-mail mass mail request to
                                UnityMail
                        End If
                    End If
                Else
                    Update release to DB with "pending"
                        status
                    E-mail notification to Client Services
                End If
            End If
        End If
    Else
        If # of tickers > 1 then
            Trim extraneous header and footer data from
                HTML file
                E-mail notification to point person in Client
                    Services
            Else
                Trim extraneous header and footer data from
                    HTML file
                E-mail notification to Client Services
            End If
        End If
        Copy release files to archive
    End If
    Delete files from download directory
Next news release
Delete files from unwanted sources
```

Event scheduling and notification system 100 also provides the capability for a user to access and listen to live audio conferences or archived conference call records. To provide access to archived conference call records 175, events scheduling system 100 provides an interactive HTML audio link 210 (reference FIG. 9) that causes events manager 101 to transmit a streaming audio feed to the personal computing device 105 associated with the requesting user. Upon receiving an electronic message from personal computing device 105 indicating operator selection of an interactive HTML link associated with a request to receive a streaming archived conference call record 175, events manager 101 requests scripting engine 102 to execute one or more scripts 125 to retrieve the archived conference call record 175 from investor events database 104. Upon receipt of the archived conference call record 175 from investor events database 104, events manager 101 then transmits the call record 175 information to personal computing device 105 as a streaming audio file. Personal computing device 105 then uses a web browser based audio player, such as, but not limited to, RealPlayer™ provided by Real Networks, Inc., in order to allow the user to listen to the archived conference call record 175.

To provide access to live conference calls, events scheduling system 100 provides an interactive HTML audio link 210 that routes the user to the web server that is providing a live audio streaming feed using an electronic network such as the Internet. Different visual icons are used to allow the user to distinguish between live conference call links 210 and archived record links 210, as described in FIG. 9.

FIG. 9 provides an example of an initially-provided interactive web page (i.e., a home page) provided by a preferred embodiment of the present invention in response to receiving an HTTP message specifying the URL for events manager 101. Referring now to FIG. 9, the home page provides an interactive entry field for registered users (i.e., subscribers) to log onto event scheduling and notification system 100. Registered users log onto event scheduling and notification system 100 by entering a previously assigned username and password pair. Unregistered users may obtain a username and password from events manager 101 by registering with event scheduling and notification system 100 using the interactive web page as shown in FIG. 5. Upon registration, events manager 101 causes the registration information obtained from the user submitted via interactive web page to be stored in personalization data 165.

If a user enters a user name and password in the appropriate interactive fields of the home page (reference FIG. 9) and transmits the home page to events manager 101 via HTTP message from personal computing device 105, events manager 101 compares the corresponding user name and password information contained in personalization data 165. If the entered information matches the corresponding information contained in personalization data 165, the registered user is provided access to detailed IR reports 103 for organizations listed on watchlist 160. Initially, the registered subscriber user is provided with an IR report 103 listing all scheduled events for all organizations listed on watchlist 160. An example of a preferred embodiment of an initial detailed IR report 103 providing a list of upcoming watchlist events is shown in FIG. 10a.

Users can access organization event information by entering the stock market ticker symbol in the indicated field of the user interactive client home page associated with event scheduling and notification system 100. An example of a preferred embodiment of a web page containing a user interface display of event scheduling and notification system 100 is shown in FIG. 9. Entering a particular ticker symbol causes event scheduling and notification system 100 to report all investor-related information contained in investor events database 104 for the selected organization. In a most preferred embodiment, event scheduling and notification system 100 provides the capability for a user to search investor events database 104 by organization (e.g., company name or ticker symbol), by event, or by date/time.

Figure 10B:
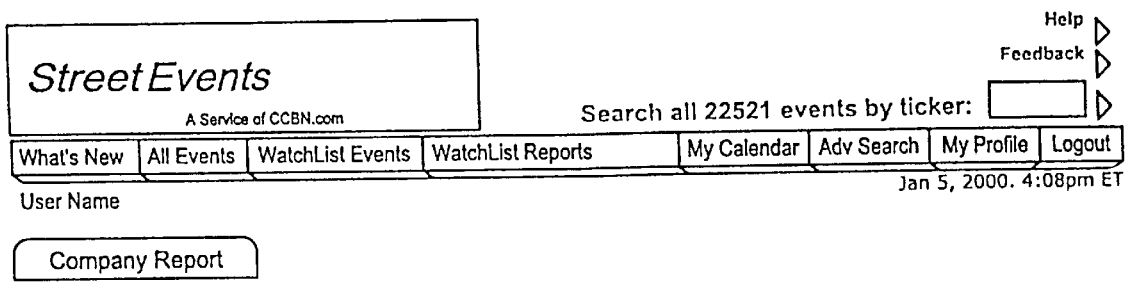
FIG. 10b is an example of a preferred embodiment of an organization report provided for each organization contained in a watchlist.

Referring now to FIG. 10a, in a preferred embodiment of event scheduling and notification system 100, IR reports 103 provide an interactive tab bar 215 that allows a registered user to select from among a variety of IR reports 103 using the individual tabs of tab bar 215. User-selectable IR reports 103 include, but are not limited to, separate interactive ASP web page reports providing:

(1) The most recently scheduled events 150 (e.g., "What's New" tab);

(2) All scheduled events 150 stored in investor events database 104 (e.g., "All Events" tab);

(3) Events 150 associated with each organization contained in watchlist 160 (e.g., "Watchlist Events" tab);

(4) Organization reports for each organization contained in watchlist 160 (e.g., "Watchlist Reports" tab), an example of which is shown in FIG. 10b;

(5) A personal calendar showing dates of events 150 for each organization contained in watchlist 160 (e.g., "My Calendar" tab), an example of which is shown in FIG. 10c;

(6) An advanced event 150 searching capability for locating one or more specific events 150 or for excluding one or more specific events 150 from the search (e.g., "Adv Search" tab), an example of which is shown in FIG. 10d; and (7) Display of Personalization data 165 for the registered subscriber (e.g., "My Profile" tab), an example of which is shown in FIG. 5.

In addition, events 150 listed in IR reports 103 may be searched and displayed according to a variety of criteria such as, but not limited to, event date/time, event location (e.g., city, state, country), organization, or type of event (e.g., archived conference call, live conference call).

Preferably, investor events database 104 does not require or receive HTML-formatted input data or data received via HTTP interface at the time of generation of any one of IR reports 103. Further, no dynamic data from reporting organizations or their web sites is used directly by events manager 101 at the time of generation of any one of IR reports 103. That is, all investor information needed to produce any one of IR reports 103 is contained entirely in investor events database 104. No run-time HTML or other input is required from the reporting organization to produce any IR report 103 as defined herein.

Events manager 101 further provides a conflict detection and reporting capability that automatically detects and notifies users of date/time scheduling conflicts among events 150 for reporting organizations contained in a particular user's watchlist 160. In a preferred embodiment, whenever a new event 150 is attempted to be scheduled for an organization contained in watchlist 160, events manager 101 compares the date and time scheduling information for the new event 150 to the date and time information for each and every scheduled event 150 for each and every other organization contained in watchlist 160. Alternatively, a user can request events manager 101 to check for possible conflicts for a proposed new scheduled event 150. In either case, if the date/time for one or more existing scheduled events 150 for other. organizations contained in watchlist 160 conflicts with the proposed date/time for the new event 150, events manager 101 transmits an IR report 103 to the personal computing device 105 of the user proposing the new event 150 describing the conflict. If the conflict check was explicitly requested by the user, and events manager 101 does not determine a conflict to exist, then events manager 101 transmits an IR report 103 to the personal computing device 105 of the user proposing the new event 150 indicating no conflicts.

Figure 11:
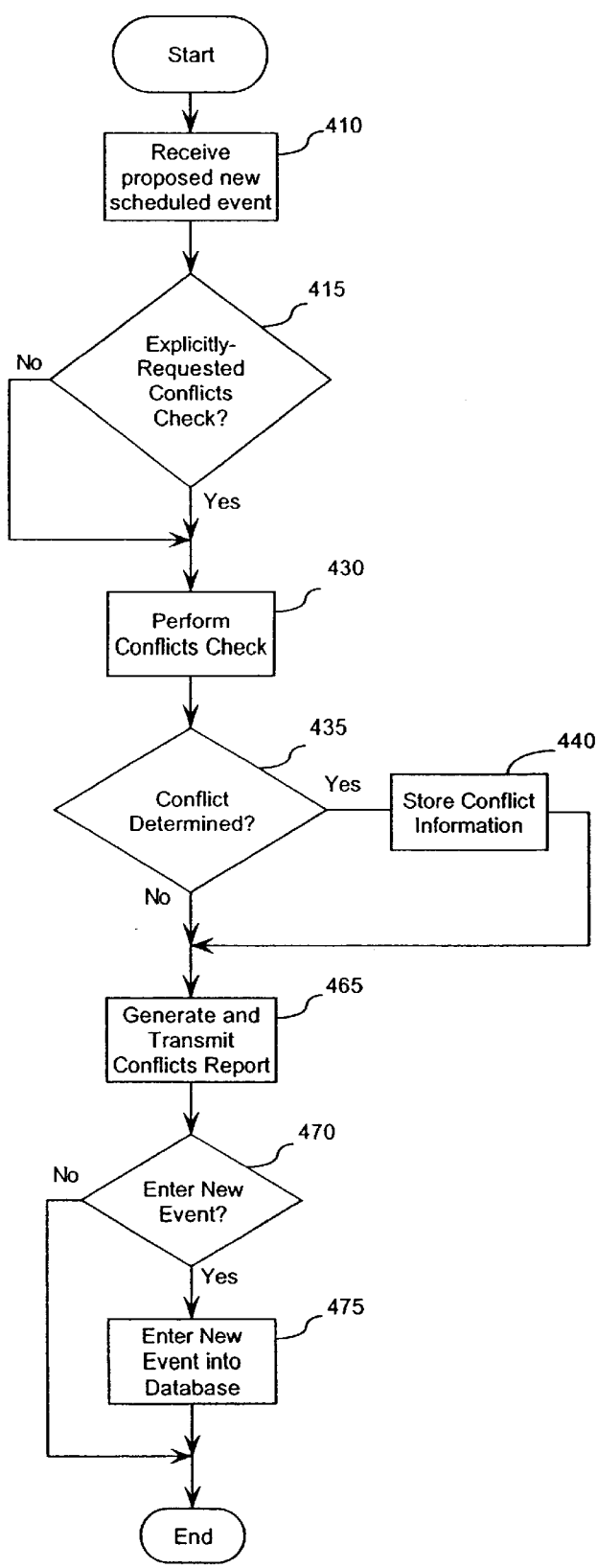
FIG. 11 is a detailed description of a conflict detection and reporting method according to the present invention.

In either case, events manager 101 prompts the user to indicate to events manager 101 whether or not to enter the proposed new event 150 into investor events database 104. If the user sends an indication to events manager 101 to schedule the new event 150, then events manager 101 schedules the new event 150 and new event notifications are transmitted as described herein. The conflicts determination process is described in further detail as follows and as shown in FIG. 11.

In a preferred embodiment, events manager 101 initiates conflicts determination processing 400 in response to receiving a user proposal to schedule a new event 150 during an Internet session with that user (block 410). The user proposal is transmitted from personal computing device 105 and received by events manager 101 via interactive web page in accordance with the HTTP messaging protocol. If a user session is not already established, the user may first establish a session as described elsewhere herein.

Events manager 101 next determines if the user proposal contains an indication that the user has explicitly requested a conflicts check (block 415). In a preferred embodiment, this is accomplished by checking the contents of a predefined interactive field of the ASP-formatted interactive web page received from personal computing device 105. If a conflicts check is explicitly requested, then events manager 101 proceeds to block 430; otherwise, if the user proposal does not contain an indication that the user has explicitly requested a conflicts check as determined in block 415, then events manager 101 also proceeds to block 430.

Upon receipt of a requested conflicts check from block 415 or a determination of a new event 150 being scheduled for an organization contained on watchlist 160 from block 410, events manager 101 performs conflicts check processing as follows (block 430). In a preferred embodiment, events manager 101 requests scripting engine 102 to execute one or more scripts 125 to retrieve and compare each event 150 record for each organization contained in the submitting user's watchlist 160. The associated script or scripts 125 specify one or more database query procedure calls, preferably in the form of SQL instructions, to DBMS 170 that cause DBMS 170 to retrieve the records for these events 150 and compare the date/time information fields of each event 150 record to the date/time information specified in the user proposal to determine if the new event 150 conflicts in time with one or more existing scheduled events 150.

Figure 12:
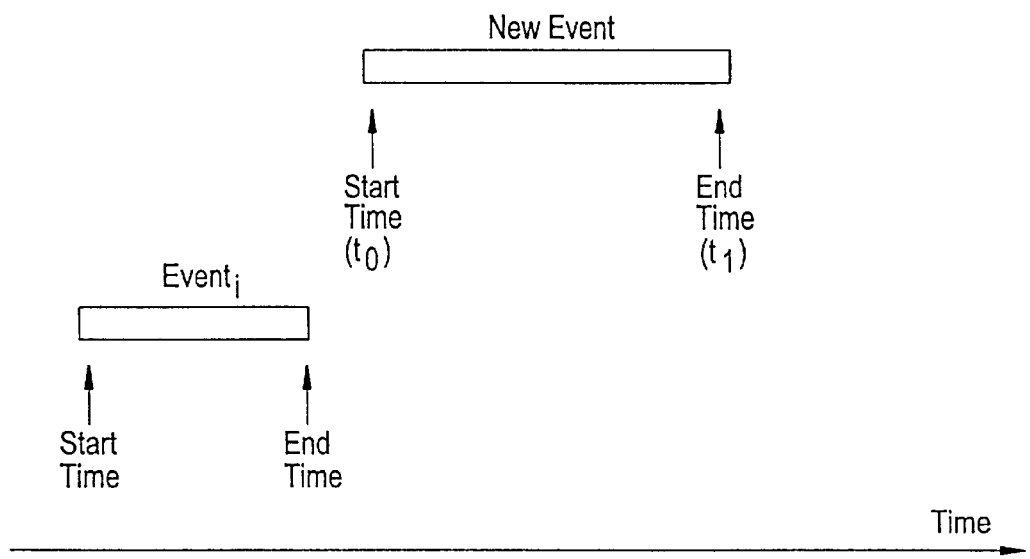
FIG. 12 is a description of a non-conflict condition between a new event and an existing event.
Figure 13:
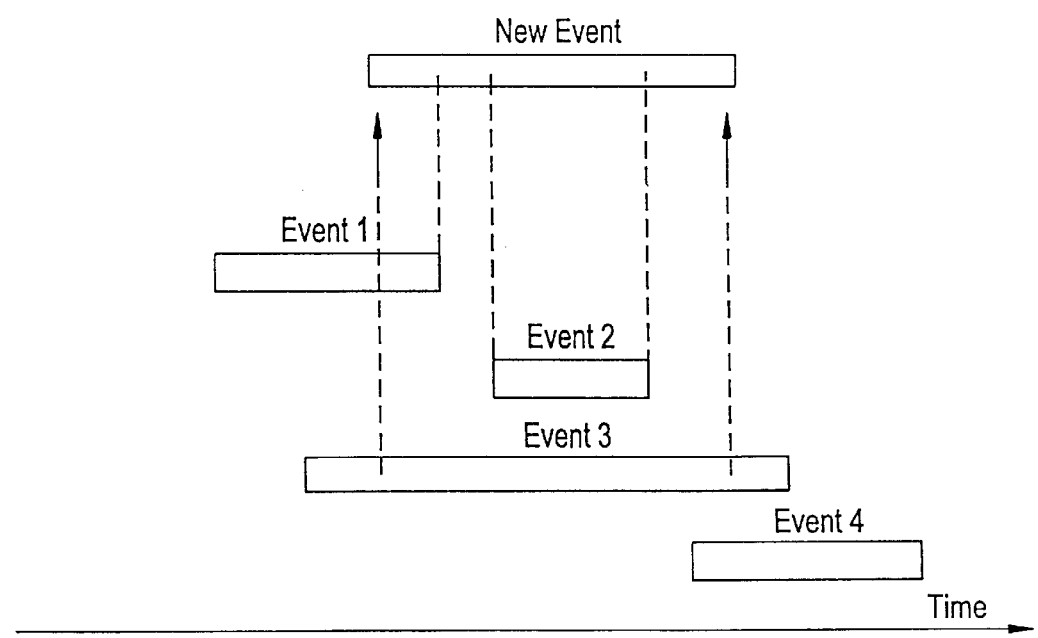
FIG. 13 is a description of four possible conflict conditions between a new event and an existing event.
Figure 14:
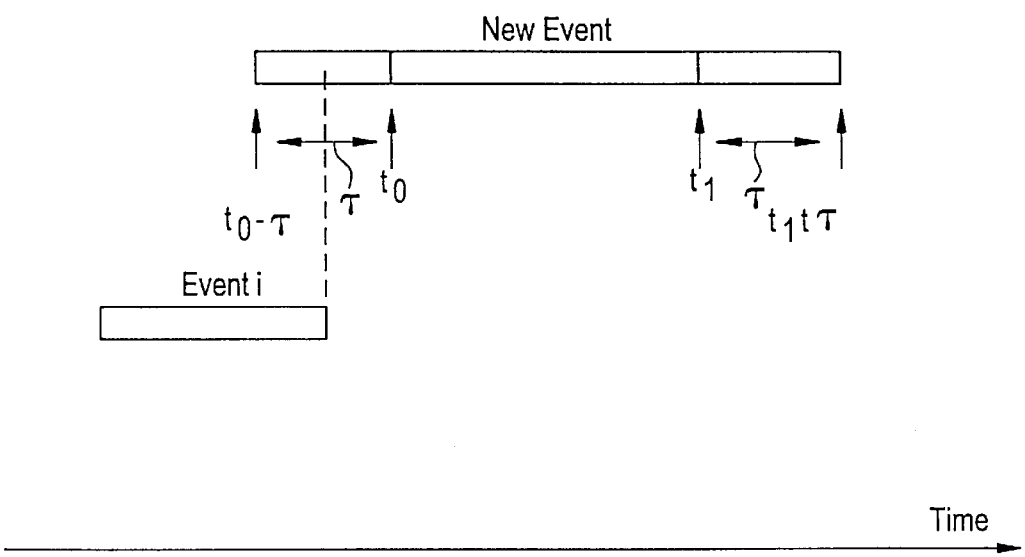
FIG. 14 is a description of a possible conflict condition between a new event and an existing event for an alternative embodiment of the present invention that includes a time buffer.

This process is shown in more detail in FIGS. 13 and 14. More specifically, in a preferred embodiment, events manager 101 determines a conflict condition if any point during the time duration for the new event 150 coincides with any point in time during the time duration of an existing event 150 (block 435). Existing events may be denoted as Event$_i$. FIG. 12 shows a non-conflict condition. FIG. 13 shows four possible conflict conditions between a new event 150 and an existing event 150, Event$_i$.

In an alternative embodiment, events manager 101 determines a conflict condition if any point during the time duration for the new event 150 expanded by a buffer time, $\tau$, coincides with any point in time during the duration of an existing event 150, Event$_i$. This alternative embodiment is shown in FIG. 14. Referring now to FIG. 14, let $t_0$ be the start time for new event 150, $t_1$ be its end time, and $\tau$ be the buffer time. The duration for new event 150 is increased by an amount $2\tau$, for conflicts check processing purposes, by modifying the start time $t_0$ to begin earlier in time by an amount $\tau$ and by modifying the end time $t_1$ to end later in time by an amount $\tau$. The buffer time, $\tau$, is specified by the user by entering the desired buffer time, in units of minutes, into a predefined interactive field of the ASP-formatted interactive web page received from personal computing device 105. In this alternative embodiment, the duration of new event 150 for conflict checking purposes begins at modified start time $t_0-\tau$ and ends at modified end time $t_1+\tau$. This alternative embodiment is thus useful for events manager 101 to account for an operator-selectable desired buffer time between scheduled events 150 of interest to the user.

Referring again to FIG. 11, if events manager 101 determines a conflict condition in block 430 (block 435), then events manager 101 stores relevant information associated with the existing event 150, Event$_i$, for generation of a IR report 103 indicating a conflict condition (block 440). Relevant event 150 information obtained from investor events database 104 and stored includes, but is not limited to, a description of the conflicting existing event 150, its start and end times, its associated organization, and a description of the new event 150, its start and end times, and its associated organization.

Upon performing conflicts check processing and storing any conflict information, events manager 101 generates an IR report 103 as described herein indicating the conflict condition(s) thus determined, using the stored conflicts to information from block 440 (block 465). To generate the IR report 103 indicating a conflict condition, events manager 101 requests scripting engine 102 to execute one or more ASP scripts 125 to generate the requested interactive web page from the information contained in investor events database 104 as described elsewhere herein. The web page thus generated is then transmitted by events manager 101 to the personal computing device 105 of the user proposing the new event 150 in accordance with the HTTP messaging protocol. Personal computing device 105 then displays IR report 103 to the user via web browser.

Upon receiving the IR report 103, the proposing user may choose to request events manager 101 to enter the proposed scheduled event 150 despite any indicated conflicts (block 470). The proposing user may accomplish this by transmitting an electronic message, in accordance with the HTTP messaging protocol, from the personal computing device 105 of the user to events manager 101 a request to enter the new scheduled event 150. Upon receipt of this request, events manager 101 enters the new scheduled event 150 into investor events database 104 as described elsewhere herein (block 475). If the user does not wish to enter the proposed new scheduled event 150, the proposing user may choose to modify the start and/or stop times for the new scheduled event 150 in order to avoid one or more conflicts, and then reinitiate conflict check processing for the modified proposed new scheduled event 150 (block 470).

In this way, a user of event scheduling and notification system 100 according to the present invention is automatically notified of scheduling conflicts for organizations on watchlist 160 that would result if the proposed new event 150 were to be scheduled. This allows a proposing user to use the conflicts feedback received via IR report 103 to determine a preferred schedule for the new event 150. For example, a user can choose to modify the start and/or stop times for the proposed new event 150 to minimize or avoid date/time conflicts among other organizations' events 150 of interest to the same analyst or group of analysts.

In an alternative embodiment, events manager 101 further provides an event guard reporting capability in addition to the conflict detection and reporting capability described herein. In this alternative embodiment, events manager 101 automatically detects a conflict condition (as. described earlier herein) in which a new scheduled event 150 has been entered that conflicts in date/time with one or more existing events 150. Upon detecting one or more such conflict conditions, event manager 101 transmits one or more IR reports 103 to the personal computing devices 105 of users associated with the existing scheduled events 150 for which a conflict condition has been determined, in order to notify the users of the date/time scheduling conflicts caused by the newly entered event 150. Events manager 101 may determine the set of users to be notified in a variety of ways including, but not limited to: By requesting scripting engine 102 to execute one or more scripts 125 to retrieve and identify, using watchlists 160, the users associated with organizations associated with each existing event 150 for which a conflict condition has been determined; by including in each watchlist 160 record a further optional information field in which a user may specify one or more organizations for which events manager 101 should report conflicting new scheduled events 150; or by events manager 101 maintaining one or more lists of organizations for whom a particular set of users will be notified of conflicting events (e.g., all Fortune 100 company events).

Thus, an automated event scheduling and notification system and method has been shown that provides reliable and timely dissemination of investor relations information and events, including automatic notification of conflicts in the scheduling of investor relations events, and that provides automatic notification of scheduled investor relations events and information releases.

While the above description contains much specific detailed information, these details should not be construed as limitations on the scope of the invention, but rather as an exemplification of one preferred embodiment thereof. Other variations are possible. Accordingly, the scope of the present invention should be determined not by the embodiments illustrated above, but by the appended claims and their legal equivalents.

What is claimed is:

1. A method of transmitting information release notifications comprising:

receiving a plurality of new information releases containing HyperText Markup Language (HTML) formatted information from an external information service via an electronic network;

associating one or more notified users with a particular-one of a plurality of identifier symbols, each one of said identifier symbols uniquely corresponding to a particular organization, and each one of said new information releases including at least one of said identifier symbols;

converting the contents of one of said information releases containing at least one of said identifier symbols to form an American Standard Code for Information Interchange (ASCII) text formatted information notification message; and transmitting said information notification message to the personal computing device of each one of said notified users associated with said at least one of said identifier symbols.

2. An automated events scheduling and notification system comprising:

an events manager capable of electronically receiving from an external information service a plurality of new information releases containing HyperText Markup Language (HTML) formatted information, each of said information releases including an identifier symbol uniquely corresponding to a particular organization;

said events manager communicating with said information service using an electronic network;

at least one personal computing device, said personal computing device associated with a particular notified user, and said personal computing device communicating with said events manager using an electronic network;

a database for storing said information releases, said database operably coupled to said events manager, and said database including a plurality of information interest lists;

each of said information interest lists associating one or more of said notified users with a particular one of said identifier symbols;

said events manager capable of detecting the presence of each and any of said identifier symbols contained in one of said information releases;

said events manager capable of converting the contents of said information release to form an American Standard Code for Information Interchange (ASCII) text formatted information notification message; and said events manager capable of transmitting said information notification message to the personal computing device associated with each of said notified users associated with said detected identifier symbol.

3. The automated events scheduling and notification system of claim 2 in which said information notification-message is provided in conformance with the Simple Mail Transport Protocol (SMTP).

4. An automated events scheduling and notification system comprising:

an events manager;

said events manager including receiving means for receiving from an external information service a plurality of new information releases containing HyperText Markup Language (HTML) formatted information, each of said information releases including an identifier symbol uniquely corresponding to a particular organization;

at least one personal computing device, said personal computing device associated with a particular notified user, and said personal computing device communicating with said events manager using an electronic network;

storage means operably coupled to said events manager for storing said information releases, said storage means including a computer-readable medium programmed to associate one or more of said notified users with a particular one of said identifier symbols;

said events manager including a computer-readable medium programmed to:
 (1) detect the presence of each and any of said identifier symbols contained in one of said information releases; and
 (2) convert the contents of said information release to form an American Standard Code for Information Interchange (ASCII) text formatted information notification message; and said events manager including transmission means for transmitting said information notification message to the personal computing device associated with each of said notified users associated with said detected identifier symbol.

5. An automated events scheduling and information notification system comprising:

an events manager;

a plurality of personal computing devices operably coupled to said events manager for transmitting and receiving electronic messages to and from users of the system using an electronic network;

a database for storing events information and a plurality of watchlists that associate users with at least one organization;

said database operably coupled to a database server;

said events manager operably coupled to said database server and further comprising means for accessing said database via said database server;

said events manager being capable of receiving new event scheduling information or requests for reports submitted by one of a plurality of users, producing a plurality of event reports using event information contained in said database and said watchlists, and electronically transmitting said event reports to selected users;

said events manager capable of automatically transmitting said event reports to a plurality of event addressees comprising users associated with said organization associated with said new event as determined by said database;

said events manager capable of electronically receiving from an external information service a plurality of new information releases containing information formatted in accordance with the HyperText Markup Language (HTML), each of said information releases including an identifier symbol uniquely corresponding to a particular organization;

said events manager communicating with said information service using an electronic network;

said database capable of storing said information releases, said database including a plurality of information interest lists;

each of said information interest lists associating one or more notified users with a particular one of said identifier symbols;

said events manager capable of detecting the presence of each and any of said identifier symbols contained in one of said information releases;

said events manager capable of converting the contents of said information releases to form an American Standard Code for Information Interchange (ASCII) text formatted information notification message; and said events manager capable of transmitting said information notification message to the personal computing device associated with each of said notified users associated with said detected identifier symbol.

6. A method of collecting and disseminating notifications of events and information releases using an electronic network comprising the steps of:

receiving scheduling information for a new event from a user via an electronic message over an electronic network;

storing said new event scheduling information in a database;

associating, in said database, each said stored event information with an organization, and each organization with one or more of said users;

generating a report describing said stored event;

transmitting said report via an electronic message using an electronic network to a plurality of users associated with said organization associated with said event as determined by said database;

receiving a plurality of new information releases containing HyperText Markup Language (HTML) formatted information from an external information service via an electronic network;

storing said new information releases in said database;

associating one or more notified users with a particular one of a plurality of identifier symbols, each one of said identifier symbols uniquely corresponding to a particular organization, and each one of said new information releases including at least one of-said identifier symbols;

detecting the presence of each and any of said identifier symbols contained in one of said information releases;

converting the contents of one of said information releases containing at least one of said identifier symbols to form a American Standard Code for Information Interchange (ASCII) text formatted information notification message; and transmitting said information notification message to the personal computing device of each one of said notified users associated with said detected identifier symbols.

\* \* \* \* \*